United States Patent

Niizuma (10) Patent No.: US 10,377,254 B2
(45) Date of Patent: Aug. 13, 2019

(54) WIRELESS POWER TRANSMISSION DEVICE AND VEHICLE

(71) Applicant: IHI CORPORATION, Tokyo (JP)

(72) Inventor: Motonao Niizuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 572 days.

(21) Appl. No.: 14/858,200

(22) Filed: Sep. 18, 2015

(65) Prior Publication Data

US 2016/0009187 A1 Jan. 14, 2016

Related U.S. Application Data

(63) Continuation of application No. PCT/JP2013/063386, filed on May 14, 2013.

(51) Int. Cl.

| | |
|---|---|
| *B60L 11/18* | (2006.01) |
| *H02J 50/12* | (2016.01) |
| *H02J 50/60* | (2016.01) |
| *H02J 7/02* | (2016.01) |
| *H02J 5/00* | (2016.01) |
| *H01F 38/14* | (2006.01) |
| *H02J 7/00* | (2006.01) |
| *B60L 53/12* | (2019.01) |
| *B60L 53/124* | (2019.01) |

(52) U.S. Cl.
CPC ............ *B60L 11/182* (2013.01); *B60L 53/12* (2019.02); *B60L 53/124* (2019.02); *H01F 38/14* (2013.01); *H02J 5/00* (2013.01); *H02J 7/0042* (2013.01); *H02J 7/025* (2013.01); *H02J 50/12* (2016.02); *H02J 50/60* (2016.02); *Y02T 10/7005* (2013.01); *Y02T 10/7072* (2013.01); *Y02T 90/122* (2013.01); *Y02T 90/14* (2013.01)

(58) Field of Classification Search
CPC ..................................................... Y02T 90/122
USPC .................................................. 307/9.1, 10.1
See application file for complete search history.

(56) References Cited

U.S. PATENT DOCUMENTS

| | | | | |
|---|---|---|---|---|
| 5,505,787 A | * | 4/1996 | Yamaguchi | A47L 1/08 134/26 |
| 5,703,461 A | * | 12/1997 | Minoshima | H01F 38/14 320/108 |
| 8,441,450 B2 | * | 5/2013 | Degner | G06F 3/03547 345/173 |
| 8,981,599 B2 | | 3/2015 | Kamata | |

(Continued)

FOREIGN PATENT DOCUMENTS

| | | |
|---|---|---|
| CN | 102118069 A | 7/2011 |
| CN | 102570627 A | 7/2012 |

(Continued)

OTHER PUBLICATIONS

International Search Report, PCT/JP2013/063386, dated Aug. 13, 2013, 2 pgs.

(Continued)

*Primary Examiner* — Adam D Houston
(74) *Attorney, Agent, or Firm* — Volpe and Koenig, P.C.

(57) ABSTRACT

A wireless power transmission device includes a power-supplying coil configured to wirelessly transmit power to an electric vehicle (EV) serving as a vehicle, be installed in a slanted state or perpendicularly to a horizontal plane, and form an electromagnetic coupling circuit along with a power-receiving coil provided in the EV.

13 Claims, 4 Drawing Sheets (56) References Cited

U.S. PATENT DOCUMENTS

| | | | |
|---|---|---|---|
| 9,643,505 B2* | 5/2017 | Ichikawa | B60L 5/005 |
| 9,694,685 B2* | 7/2017 | Ricci | B60L 3/0015 |
| 9,827,864 B2* | 11/2017 | Asai | B60L 53/36 |
| 9,859,955 B2* | 1/2018 | Keeling | H02J 50/80 |
| 9,866,752 B2* | 1/2018 | Zhang | H04N 13/239 |
| 9,876,535 B2* | 1/2018 | Keeling | H04B 5/0037 |
| 9,889,754 B2* | 2/2018 | Percebon | B60L 11/182 |
| 9,921,045 B2* | 3/2018 | Sieber | G01B 7/003 |
| 9,923,406 B2* | 3/2018 | Percebon | H02J 7/042 |
| 9,925,886 B2* | 3/2018 | Halker | B60L 11/1846 |
| 9,931,952 B2* | 4/2018 | Tripathi | B60L 11/182 |
| 9,941,708 B2* | 4/2018 | Keeling | H02J 5/005 |
| 9,969,282 B2* | 5/2018 | van Boheemen | H02J 50/10 |
| 9,971,353 B2* | 5/2018 | Tripathi | G05D 1/0276 |
| 9,972,434 B2* | 5/2018 | Keeling | H01F 27/022 |
| 9,983,300 B2* | 5/2018 | Sieber | G01S 13/06 |
| 2004/0066346 A1* | 4/2004 | Huor | H01Q 21/005 |
| | | | 343/770 |
| 2010/0074723 A1* | 3/2010 | Lancon | B65D 21/086 |
| | | | 414/800 |
| 2010/0146308 A1 | 6/2010 | Gioscia et al. | |
| 2010/0235006 A1 | 9/2010 | Brown | |
| 2011/0043414 A1* | 2/2011 | Webb | H01Q 1/02 |
| | | | 343/702 |
| 2011/0067960 A1* | 3/2011 | Miki | E04H 6/426 |
| | | | 188/32 |
| 2011/0243697 A1* | 10/2011 | Braun | B60P 1/006 |
| | | | 414/506 |
| 2011/0285349 A1* | 11/2011 | Widmer | B60L 11/182 |
| | | | 320/108 |
| 2012/0161537 A1 | 6/2012 | Kamata | |
| 2012/0255279 A1* | 10/2012 | Atluri | B60K 1/04 |
| | | | 60/274 |
| 2012/0318586 A1* | 12/2012 | Atarashi | B60L 5/005 |
| | | | 180/2.1 |
| 2013/0015699 A1 | 1/2013 | Mita | |
| 2013/0063082 A1* | 3/2013 | Lee | H02J 7/025 |
| | | | 320/108 |
| 2014/0064770 A1* | 3/2014 | Yanata | G01V 8/10 |
| | | | 399/74 |
| 2014/0070764 A1* | 3/2014 | Keeling | H04B 5/0037 |
| | | | 320/108 |
| 2014/0071547 A1* | 3/2014 | O'Neill | G02B 7/02 |
| | | | 359/827 |
| 2014/0155269 A1* | 6/2014 | Daibo | H01F 6/06 |
| | | | 505/211 |
| 2014/0174870 A1* | 6/2014 | Niizuma | H02J 5/005 |
| | | | 191/10 |
| 2015/0061583 A1* | 3/2015 | Nakamura | H01F 27/36 |
| | | | 320/108 |
| 2015/0123488 A1 | 5/2015 | Kamata | |
| 2015/0128362 A1* | 5/2015 | Niizuma | H02J 7/0027 |
| | | | 15/3 |
| 2015/0137801 A1* | 5/2015 | Raedy | H02J 5/005 |
| | | | 324/207.15 |
| 2015/0214751 A1* | 7/2015 | Niizuma | B60L 53/36 |
| | | | 307/9.1 |
| 2015/0246620 A1* | 9/2015 | Fukushima | B60L 53/37 |
| | | | 307/10.1 |
| 2015/0278038 A1* | 10/2015 | Halker | G06F 11/20 |
| | | | 714/3 |
| 2015/0357828 A1* | 12/2015 | Ichikawa | H01F 38/14 |
| | | | 307/104 |
| 2015/0372493 A1* | 12/2015 | Sankar | H02J 7/025 |
| | | | 307/104 |
| 2016/0009187 A1* | 1/2016 | Niizuma | H02J 5/00 |
| | | | 307/9.1 |
| 2016/0052408 A1* | 2/2016 | Asai | B60L 11/182 |
| | | | 180/65.1 |
| 2016/0159233 A1* | 6/2016 | Kim | B60L 11/1829 |
| | | | 320/108 |
| 2016/0236574 A1* | 8/2016 | Asai | B60L 53/36 |
| 2016/0339791 A1* | 11/2016 | Sim | G06Q 50/06 |
| 2016/0363679 A1* | 12/2016 | Jurok | G01V 1/162 |
| 2017/0043668 A1* | 2/2017 | Chiyo | B60L 53/30 |
| 2017/0136898 A1* | 5/2017 | Ahmadi | H02J 17/00 |
| 2017/0207658 A1* | 7/2017 | Bana | H02J 50/12 |
| 2017/0264102 A1* | 9/2017 | Maekawa | B60L 53/36 |

FOREIGN PATENT DOCUMENTS

| | | | |
|---|---|---|---|
| JP | 09-017667 A | | 1/1997 |
| JP | 10-028332 A | | 1/1998 |
| JP | 10172823 A | * | 6/1998 |
| JP | 2001-128392 A | | 5/2001 |
| JP | 2001196832 A | * | 7/2001 |
| JP | 2001196832 A | * | 7/2001 |
| JP | 2002015852 A | * | 1/2002 |
| JP | 2010-226946 A | | 10/2010 |
| JP | 2011-125153 A | | 6/2011 |
| JP | 2011-234514 A | | 11/2011 |
| JP | 2012-120288 A | | 6/2012 |
| JP | 2013-021886 A | | 1/2013 |
| JP | 2013-115915 A | | 6/2013 |
| WO | 2011/106506 A2 | | 9/2011 |

OTHER PUBLICATIONS

Japanese Office Action with English concise explanation, Japanese Patent Application No. 2011-259501, dated Jun. 30, 2015, 8 pgs.

* cited by examiner

WIRELESS POWER TRANSMISSION DEVICE AND VEHICLE

This application is a continuation application based on a PCT Patent Application No. PCT/JP2013/063386 filed on May 14, 2013. The content of the PCT application is incorporated herein by reference.

TECHNICAL FIELD

The present disclosure relates to a wireless power transmission device capable of wirelessly transmit power and a vehicle capable of receiving the power transmitted from the wireless power transmission device.

BACKGROUND ART

In recent years, the number of vehicles including an electric motor with an internal combustion engine or instead of the internal combustion engine as a power generation source has increased so as to realize a low carbon society. An electric vehicle (EV) is a representative vehicle including the motor instead of the engine and a hybrid vehicle (HV) is a vehicle including the motor with the engine. Such a vehicle includes a rechargeable storage battery (for example, a secondary battery such as a lithium ion battery or a nickel-metal hydride battery) configured to supply power for driving the motor, and is configured so that the storage battery can be charged with electric power supplied from an external power supply device.

For a currently commercialized EV or HV (or more precisely, a plug-in hybrid vehicle), power for charging the storage battery is mostly transmitted via a cable connecting a power supply device and a vehicle. In recent years, a method of wirelessly transmit power for charging the storage battery to the vehicle has been proposed. In order to wirelessly transmit power efficiently, it is necessary to appropriately set a relative positional relationship between a power-supplying coil provided in the power supply device and a power-receiving coil provided in the vehicle.

When a metallic foreign object intrudes between the power-supplying coil of the power supply device and the power-receiving coil of the vehicle, a problem such as degradation of transmission efficiency due to the influence of the metallic foreign object is likely to occur. A substance moved by the wind such as an aluminum foil is also considered as the aforementioned metallic foreign object, and the metallic foreign object is also likely to intrude between the power-supplying coil and the power-receiving coil while power is wirelessly transmitted. The following Patent Document 1 discloses technology for disposing a partition wall surrounding a space between the power-supplying coil of the power supply device and the power-receiving coil of the vehicle and preventing the foreign object from intruding while the vehicle is stopped.

DOCUMENT OF RELATED ART

Patent Document

[Patent Document 1]
Japanese Unexamined Patent Application, First Publication No. 2010-226946

SUMMARY

Technical Problem

In the technology disclosed in the above-described Patent Document 1, the intrusion of the metallic foreign object may be considered to be prevented because the space between the power-supplying coil of the power supply device and the power-receiving coil of the vehicle is surrounded by a partition wall while the vehicle is stopped in an area in which power transmission can be performed. However, when the metallic foreign object intrudes into the space to be surrounded by the partition wall before the vehicle is stopped in the area in which the power transmission can be performed, a problem in power transmission is likely to occur that the metallic foreign object remains in the space surrounded by the partition wall when the vehicle moves to the area in which the power transmission can be performed.

The present disclosure is conceived in view of the above-described circumstances, and an object of the present disclosure is to provide a wireless power transmission device capable of constantly performing efficient wireless power transmission by preventing a metallic foreign object from remaining between a power-supplying coil and a power-receiving coil, and a vehicle capable of receiving power transmitted from the wireless power transmission device.

Solution to Problem

In order to achieve the above-described object, according to the first aspect of a wireless power transmission device of the present disclosure, a wireless power transmission device to wirelessly transmit power to a vehicle may include: a power-supplying coil installed in a slanted state or perpendicularly to a horizontal plane and configured to form an electromagnetic coupling circuit along with a power-receiving coil provided in the vehicle.

In the first aspect of the wireless power transmission device of the present disclosure, the power-supplying coil may be provided in a plate-like container having at least one surface on which a fluororesin coating film is formed.

Alternatively, in the first aspect of a wireless power transmission device of the present disclosure, the power-supplying coil may be provided in a plate-like container having at least one surface on which a large number of micro projections are formed.

Alternatively, in the first aspect of the wireless power transmission device of the present disclosure, the power-supplying coil may be provided in a plate-like container having at least one surface on which a large number of grooves extending in a slanted direction are formed.

In the first aspect of the wireless power transmission device of the present disclosure, the power-supplying coil may be installed in a state in which at least an upper end portion projects from an installation surface, in a place into which entry of the vehicle is inhibited by a vehicle stopper.

In the first aspect of the wireless power transmission device of the present disclosure, the power-supplying coil may be installed at a stopping position at which the vehicle should stop, in a state in which the entire power-supplying coil is embedded below an installation surface.

According to the first aspect of a vehicle of the present disclosure, a vehicle configured to receive power wirelessly transmitted from the outside may include: a power-receiving coil configured to face the power-supplying coil provided in any wireless power transmission device described above and form the electromagnetic coupling circuit along with the power-supplying coil.

Alternatively, according to the second aspect of a vehicle of the present disclosure, a vehicle configured to receive power wirelessly transmitted from the outside may include: a power-receiving coil provided in a bottom of the vehicle and configured to form the electromagnetic coupling circuit along with the power-supplying coil provided in any of the wireless power transmission devices described above.

Effects of the Disclosure

According to the present disclosure, because a power-supplying coil configured to form an electromagnetic coupling circuit along with a power-receiving coil provided in an EV that is a power supply target to which power should be supplied is installed in a slanted state or perpendicularly to a horizontal plane, a metallic foreign object on an upper surface of the power-supplying coil slides down due to gravity. Thereby, it is possible to constantly perform efficient wireless power transmission by preventing a metallic foreign object from remaining between a power-supplying coil and a power-receiving coil.

DESCRIPTION OF EMBODIMENTS

Hereinafter, a wireless power transmission device and a vehicle according to embodiments of the present disclosure will be described in detail with reference to the drawings. Hereinafter, an example in which the vehicle is an EV using only an electric motor as a power generation source will be described.

[First Embodiment]

Figure 1:
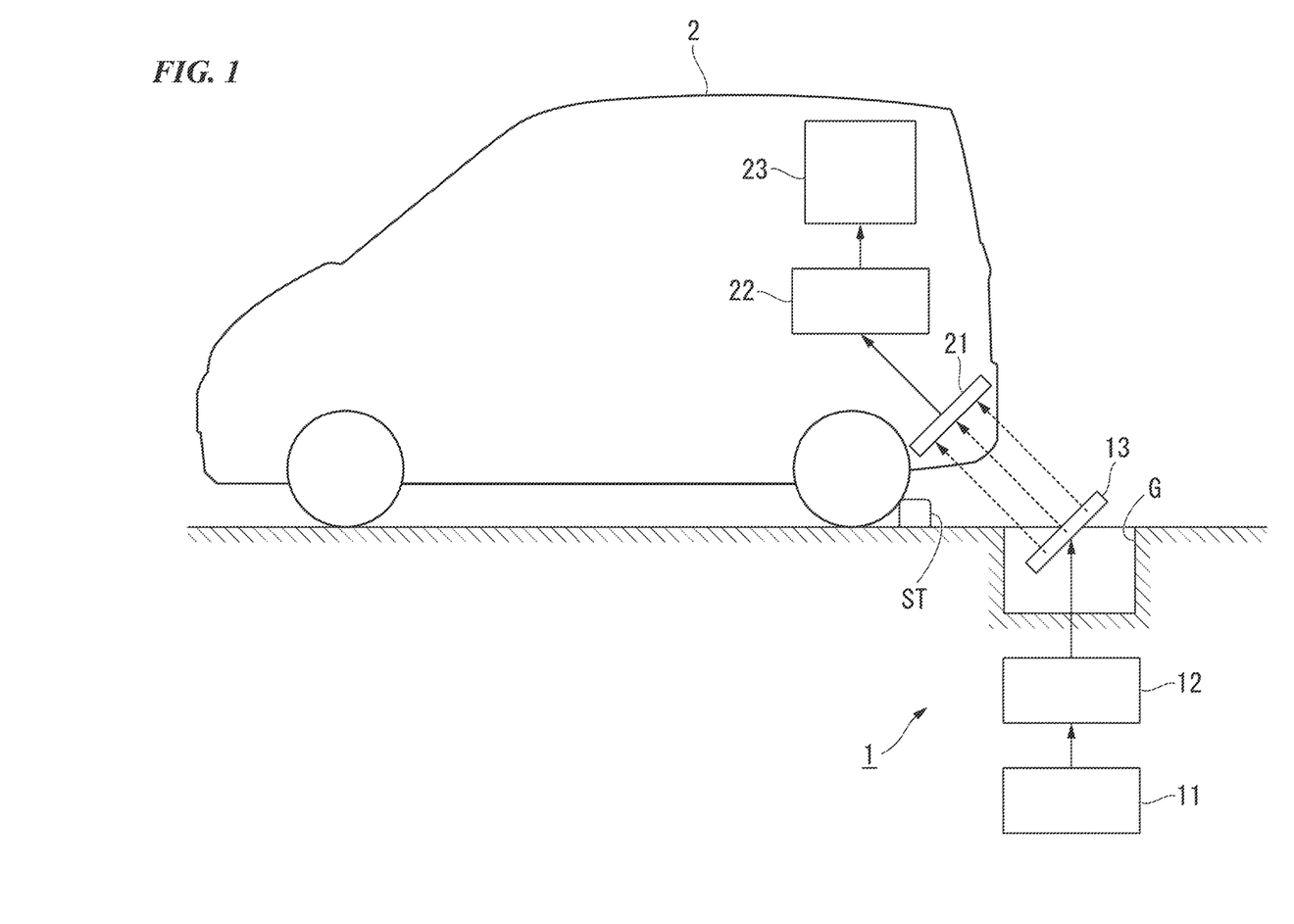
FIG. 1 is a diagram showing main part configurations and a positional relationship of a wireless power transmission device and a vehicle according to the first embodiment of the present disclosure.
Figure 2:
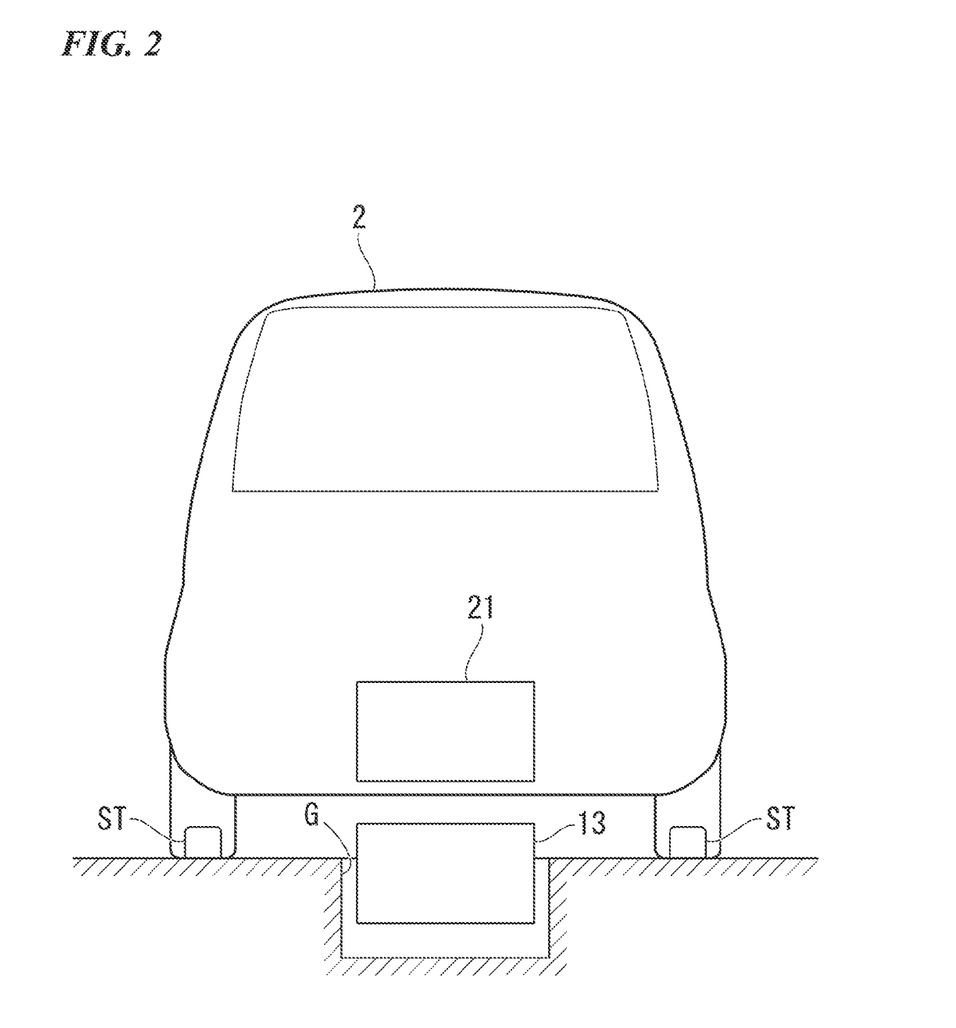
FIG. 2 is a diagram showing main part configurations and a positional relationship of the wireless power transmission device and the vehicle according to the first embodiment of the present disclosure.

FIGS. 1 and 2 are diagrams showing main part configurations and a positional relationship of a wireless power transmission device and a vehicle according to the first embodiment of the present disclosure. FIG. 1 is a diagram when the wireless power transmission device and the vehicle are viewed from the side and FIG. 2 is a diagram when the wireless power transmission device and the vehicle are viewed from the back.

As shown in FIGS. 1 and 2, the wireless power transmission device 1 of this embodiment, for example, is installed in a road surface (installation surface) of a parking place and when an EV 2 serving as the vehicle which travels on the road surface is stopped at a predefined positional relationship (a relative position where an electromagnetic coupling circuit to be described below is formed), it is possible to wirelessly transmit electric power to the EV 2 (power with which a storage battery 23 is charged). The wireless power transmission device 1 includes a power supply device 11, a power-supplying circuit 12, and a power-supplying coil 13.

The power supply device 11 is a power supply configured to supply electric power necessary to generate power to be transmitted to the EV 2, for example, a power supply configured to supply a three-phase alternating current (AC) power having a voltage of 200 [V]. The power supply device 11 is not limited to the three-phase AC power, and may be a power supply configured to supply single-phase AC power such as a commercial AC power supply.

The power-supplying circuit 12 wirelessly supplies the power supplied from the power supply device 11 to the EV 2 via an electromagnetic coupling circuit formed by the power-supplying coil 13 and a power-receiving coil 21 provided in the EV 2. Specifically, the power-supplying circuit 12 rectifies the power (AC power) supplied from the power supply device 11 into direct current (DC) power, converts the DC power into AC power suitable for wireless power transmission and supplies the AC power to the power-supplying coil 13, thereby realizing wireless power transmission to the EV 2.

It is also possible to use a DC power supply such as a fuel battery or a solar battery as the power supply device 11. In this case, rectification in the power-supplying circuit 12 can be omitted.

The power-supplying coil 13 is installed on the road surface and is a coil configured to wirelessly supply AC power supplied from the power-supplying circuit 12 to the EV 2. The above-described electromagnetic coupling circuit is formed by disposing the power-supplying coil 13 and the power-receiving coil 21 provided in the EV 2 in close proximity to each other. The electromagnetic coupling circuit refers to a circuit configured to perform wireless power supply from the power-supplying coil 13 to the power-receiving coil 21 by electromagnetically coupling the power-supplying coil 13 and the power-receiving coil 21, and may be any one of a circuit configured to perform power supply in an "electromagnetic induction scheme" and a circuit configured to perform power supply in an "magnetic field resonance scheme."

The power-supplying coil 13, for example, is slanted relative to a horizontal plane inside a groove G formed in a road surface of the parking place and an upper end portion of the power-supplying coil 13 is installed to project from the groove G in the road surface. The groove G is formed in a place in which entry of the EV 2 is inhibited by a vehicle stopper ST provided on the road surface of the parking place. The power-supplying coil 13 is installed in the slanted state relative to the horizontal plane so as to prevent transmission efficiency of the power from being degraded by enabling a metallic foreign object on an upper surface of the power-supplying coil 13 to slide down due to gravity. A slanted angle of the power-supplying coil 13 relative to the horizontal plane is determined according to the power transmission efficiency and the effect of enabling the metallic foreign object to slide down, and it is preferable that the slanted angle be, for example, about 45 to 60 degrees.

The power-supplying coil 13 is installed in a state in which the upper end portion of the power-supplying coil 13 is projected from the groove G in the road surface so as to increase the power transmission efficiency for the EV 2. If the power-supplying coil 13 has been installed to be entirely stored inside the groove G, a side wall of the groove G is positioned between the power-supplying coil 13 and the power-receiving coil 21 of the EV 2 as the power-supplying coil 13 is installed in the slanted state, so that the power transmission efficiency is degraded. In order to prevent the above-described degradation of power transmission efficiency, the power-supplying coil 13 is disposed in a state in which the upper end portion of the power-supplying coil 13 is projected from the groove G in the road surface.

Because the power-supplying coil 13 is disposed in a state in which the upper end portion of the power-supplying coil 13 is projected above the road surface, the power-supplying coil 13 is installed inside the groove G formed in a place in which the entry of the EV 2 is inhibited by the vehicle stopper ST. Although the power-supplying coil 13 is disposed in a state in which only the upper end portion of the power-supplying coil 13 is projected above the road surface in the examples of FIGS. 1 and 2, the power-supplying coil 13 may be disposed to be entirely positioned above the road surface if it is necessary to increase the power transmission efficiency.

Figure 3A:
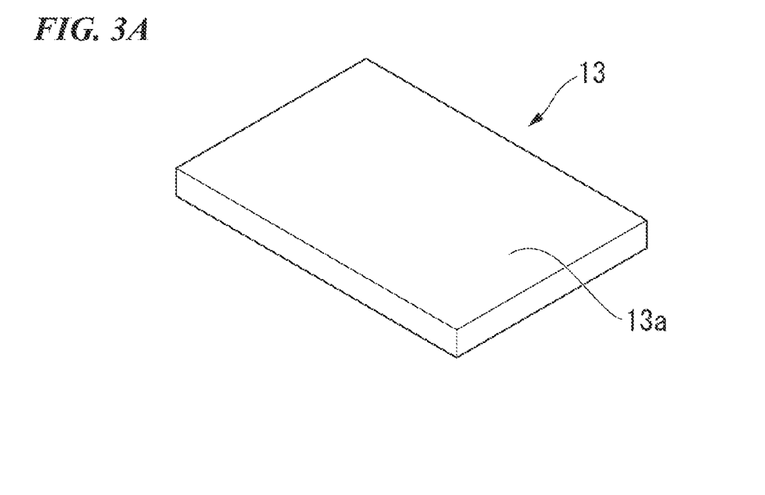
FIG. 3A is a perspective view of a power-supplying coil provided in the wireless power transmission device according to the first embodiment of the present disclosure.
Figure 3B:
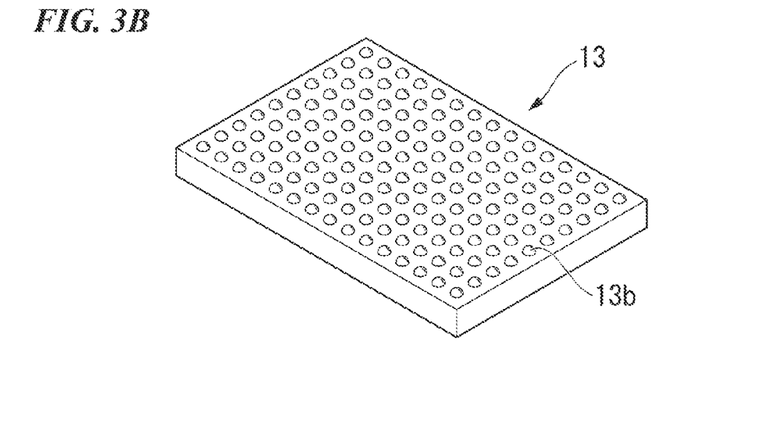
FIG. 3B is a perspective view of the power-supplying coil provided in the wireless power transmission device according to the first embodiment of the present disclosure.
Figure 3C:
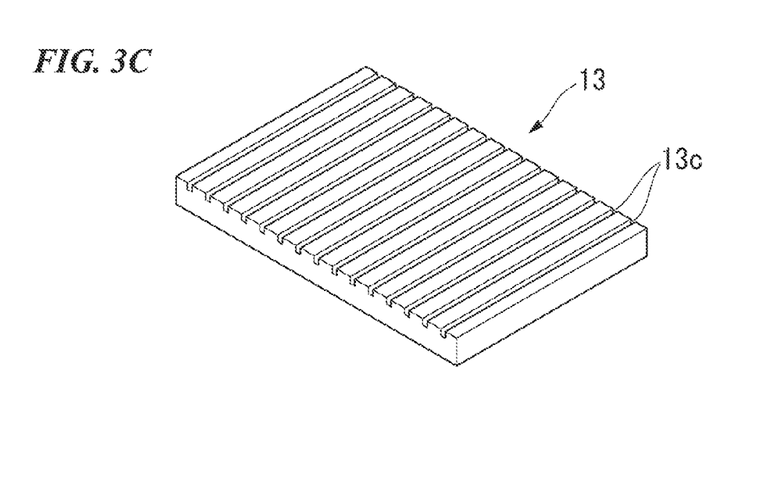
FIG. 3C is a perspective view of the power-supplying coil provided in the wireless power transmission device according to the first embodiment of the present disclosure.

FIGS. 3A, 3B, and 3C are perspective views of a power-supplying coil provided in the wireless power transmission device according to the first embodiment of the present disclosure. As shown in FIGS. 3A, 3B, and 3C, the power-supplying coil 13 is provided in a plate-like container of which a plan-view shape is a rectangle. Because the power-supplying coil 13 is installed in the slanted state relative to the horizontal plane, as described above, so that a metallic foreign object on an upper surface of the power-supplying coil 13 slides down due to gravity, the upper surface of the container including the power-supplying coil 13 is processed so that the metallic foreign object slides easily.

In the example shown in FIG. 3A, a fluororesin coating film 13a is formed on the upper surface of the container including the power-supplying coil 13. Because the slipperiness of the upper surface of the container is improved by forming the fluororesin coating film 13a, the metallic foreign object slides more easily. Because the fluororesin coating film 13a has a non-adhesive property, a foreign object other than metallic foreign object is also less likely to adhere thereto. Thus, it is possible to prevent a situation in which the sliding down of a metallic foreign object is impeded due to the adherence of a foreign object other than the metallic foreign object on the upper surface of the container.

In the example shown in FIG. 3B, a large number of micro projections 13b are formed on the upper surface of the container including the power-supplying coil 13. In FIG. 3B, for convenience of illustration, the micro projections 13b are enlarged and shown. The micro projections 13b, for example, are hemispherical micro projections, and a metallic foreign object slides easily as the frictional force is reduced, because the contact area between the upper surface of the container and the metallic foreign object is reduced. The micro projections 13b are not limited to hemispherical shapes, and may be of any shape as long as the slipperiness of the upper surface of the container is improved.

In the example shown in FIG. 3C, a large number of grooves 13c extending in a slanted direction are formed in the upper surface of the container including the power-supplying coil 13. In FIG. 3C, for convenience of illustration, the grooves 13c are enlarged and shown. The groove 13c serves as a guide for downwardly guiding the metallic foreign object on the upper surface of the container. As the grooves 13c are provided, even when a force in an intersecting direction of the groove 13c is applied, for example, to the metallic foreign object on the upper surface of the container, a force in a direction along the groove 13c is generated according to the function of the groove 13c and the metallic foreign object slides easily down.

As shown in FIGS. 1 and 2, the EV 2 serving as the vehicle includes a power-receiving coil 21, a power-receiving circuit 22, and a storage battery 23. The power-receiving coil 21 is a coil provided in a rear bottom of the EV 2 and configured to wirelessly receive power (AC power) supplied from the power-supplying coil 13 provided in the wireless power transmission device 1. The power-receiving coil 21 is in close proximity to the power-supplying coil 13 of the wireless power transmission device 1, so that the above-described electromagnetic coupling circuit is formed.

Similar to the power-supplying coil 13 provided in the wireless power transmission device 1, the power-receiving coil 21 is provided in the rear bottom of the EV 2 in the slanted state relative to the horizontal plane. This is because the power transmission efficiency increases by causing the power-receiving coil 21 to face the power-supplying coil 13 when the EV 2 has been stopped in a defined state (a state in which each of the rear wheels of the EV 2 has abutted the vehicle stopper ST) as shown in FIGS. 1 and 2. When the power-receiving coil 21 faces the power-supplying coil 13, the power-receiving coil 21 and the power-supplying coil 13 are parallel or are substantially parallel.

The power-receiving circuit 22 receives power (AC power) wirelessly supplied via the electromagnetic coupling circuit formed by the power-supplying coil 13 of the wireless power transmission device 1 and the power-receiving coil 21, and converts the received power into DC power. The storage battery 23 is a rechargeable storage battery (for example, a secondary battery such as a lithium ion battery or a nickel-metal hydride battery) mounted in the EV 2, and supplies power for driving a motor (not shown) mounted in the EV 2.

A charger configured to supply an appropriate voltage/current to the secondary battery according to a charged state may be embedded in or added to the storage battery 23.

Next, operations of the wireless power transmission device 1 and the EV 2 in the above-described configuration will be briefly described. First, the driver moves back the EV 2 until each of the rear wheels of the EV 2 abuts the vehicle stopper ST and stops the EV 2. Thereby, as shown in FIGS. 1 and 2, the power-supplying coil 13 of the wireless power transmission device 1 and the power-receiving coil 21 of the EV 2 face to form the electromagnetic coupling circuit.

Next, the wireless power transmission device 1 determines whether the EV 2 is within an area in which power transmission can be performed and starts to transmit power by operating the power-supplying circuit 12 when it is determined that the EV 2 is within the area in which the power transmission can be performed. Then, when the driver issues a charging instruction to the EV 2 in a state in which the EV 2 is stopped, charging for the storage battery 23 is started. Specifically, when a control device (not shown) provided in the EV 2 operates the power-receiving circuit 22, power (AC power) wirelessly transmitted from the wireless power transmission device 1 to the EV 2 via the electromagnetic coupling circuit formed by the power-supplying coil 13 and the power-receiving coil 21 is received by the power-receiving circuit 22. The AC power received by the power-receiving circuit 22 is converted into DC power and the storage battery 23 is charged with a DC current thereof.

As an example of the method in which the wireless power transmission device 1 determines whether the EV 2 is within the area in which the power transmission can be performed, it is possible to determine that the EV 2 is within the area in which the power transmission can be performed when a load sensor embedded in the vehicle stopper ST detects the load after each of the rear wheels of the EV 2 abuts the vehicle stopper ST.

Regardless of whether the EV 2 stops in the above-described defined state (the state in which each of the rear wheels of the EV 2 abuts the vehicle stopper ST), the metallic foreign object on the upper surface of the power-supplying coil 13 of the wireless power transmission device 1 slides down due to gravity and drops to the bottom of the groove G. Thereby, it is possible to perform efficient wireless power transmission by preventing a metallic foreign object from remaining between the power-supplying coil 13 and the power-receiving coil 21.

As described above, because the power-supplying coil 13 of the wireless power transmission device 1 is installed in the slanted state relative to the horizontal plane in this embodiment, the metallic foreign object on the upper surface of the power-supplying coil 13 slides down due to gravity. Thereby, the metallic foreign object is prevented from remaining between the power-supplying coil and the power-receiving coil and efficient wireless power transmission is constantly performed.

[Second Embodiment]

Figure 4:
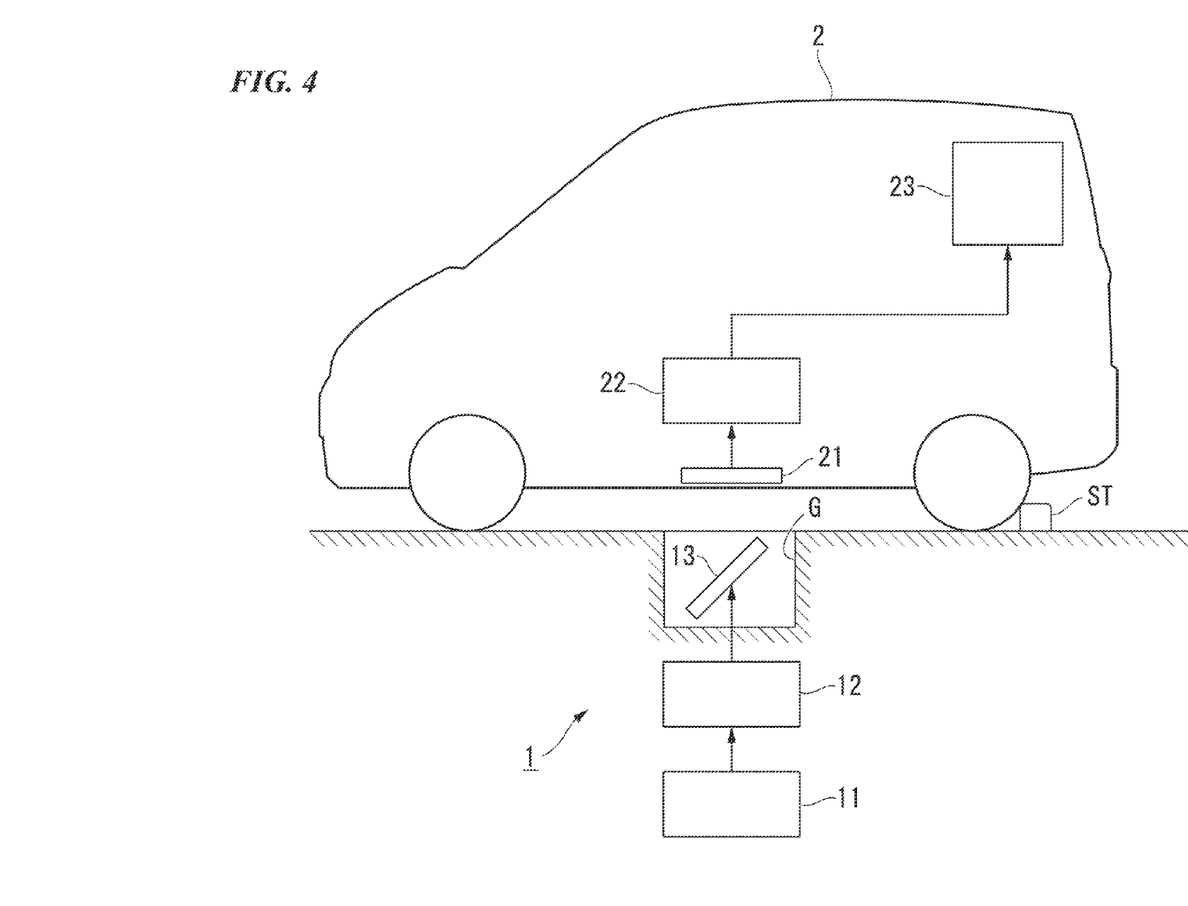
FIG. 4 is a diagram showing main part configurations and a positional relationship of a wireless power transmission device and a vehicle according to the second embodiment of the present disclosure.

FIG. 4 is a diagram showing main part configurations and a positional relationship of a wireless power transmission device and a vehicle according to the second embodiment of the present disclosure. FIG. 4 is a diagram when the wireless power transmission device and the vehicle are viewed from the side. As shown in FIG. 4, the wireless power transmission device 1 of this embodiment has a position of a power-supplying coil 13 different from that of the first embodiment and an EV 2 of this embodiment has a position of a power-receiving coil 21 different from that of the first embodiment.

That is, the power-supplying coil 13 provided in the wireless power transmission device 1 is installed in a state in which the entire power-supplying coil 13 has been embedded below the road surface at a stopping position at which the EV 2 should stop. Specifically, the power-supplying coil 13 is installed to be slanted relative to a horizontal plane inside a groove G formed in front of a vehicle stopper ST (at the stopping position at which the EV 2 should stop) and entirely stored inside the groove G. As in the first embodiment, the power-supplying coil 13 is installed in the slanted state relative to the horizontal plane so as to prevent transmission efficiency of the power from being degraded by enabling a metallic foreign object on an upper surface of the power-supplying coil 13 to slide down due to gravity. The power-supplying coil 13 is installed to be entirely stored inside the groove G so as to prevent a collision with a wheel of the EV 2.

The power-receiving coil 21 provided in the EV 2 is provided in the bottom of the EV 2 so that the power-receiving coil 21 is horizontal or substantially horizontal when the EV 2 is positioned on the horizontal plane. Specifically, when the EV 2 has stopped in the defined state (the state in which each of the rear wheels of the EV 2 abuts the vehicle stopper ST) as shown in FIG. 4, the power-receiving coil 21 is attached to a portion positioned above the power-supplying coil 13. Thereby, it is possible to reduce the space necessary for the installation of the power-receiving coil 21.

Even when the EV 2 has stopped in the defined state (the state in which each of the rear wheels of the EV 2 abuts the vehicle stopper ST) as shown in FIG. 4 in this embodiment, the power-receiving coil 21 does not face the power-supplying coil 13, and the power-receiving coil 21 and the power-supplying coil 13 are not parallel or substantially parallel. Thus, although the power transmission efficiency is degraded as compared with when the power-receiving coil 21 faces the power-supplying coil 13, it is possible to wirelessly transmit power at a certain degree of efficiency because the electromagnetic coupling circuit is formed by the power-supplying coil 13 and the power-receiving coil 21.

When the electromagnetic coupling circuit formed by the power-supplying coil 13 and the power-receiving coil 21 is a circuit configured to supply power in the "magnetic field resonance scheme," it is possible to perform highly efficient power transmission even when the power-receiving coil 21 does not face the power-supplying coil 13. Thus, in this embodiment, it is desirable to form an electromagnetic circuit configured to supply power in the "magnetic field resonance scheme" through the power-receiving coil 21 and the power-supplying coil 13.

As described above, because the power-supplying coil 13 of the wireless power transmission device 1 is installed in the slanted state relative to the horizontal plane even in this embodiment, the metallic foreign object on the upper surface of the power-supplying coil 13 will slide down due to gravity. Thereby, it is possible to constantly perform efficient wireless power transmission by preventing a metallic foreign object from remaining between a power-supplying coil and a power-receiving coil.

Although the wireless power transmission device and the vehicle according to the embodiment of the present disclosure have been described above, the present disclosure is not limited to the above-described embodiments and can be freely modified without departing from the scope of the present disclosure. For example, although an example in which the power-supplying coil 13 of the wireless power transmission device 1 is installed in the slanted state relative to the horizontal plane has been described in the above-described embodiment, the power-supplying coil 13 may be installed perpendicularly to the horizontal plane.

The fluororesin coating film 13a, a large number of micro projections 13b, or a large number of grooves 13c described using FIGS. 3A, 3B, and 3C may be formed on the bottom surface as well as the upper surface of the container including the power-supplying coil 13. Thereby, when the power-supplying coil 13 is installed, it can be installed regardless of which surface of the container to face upward.

The plan-view shape of the container in which the power-supplying coil 13 is provided is not limited to rectangular and may be, for example, oval.

Although an example in which a power supply target is an EV equipped with a storage battery has been described in the above-described embodiment, the present disclosure is also applicable to a plug-in HV and a carrier vehicle. Further, the present disclosure is applicable to an unmanned vehicle.

INDUSTRIAL APPLICABILITY

A wireless power transmission device capable of constantly performing efficient wireless power transmission by preventing a metallic foreign object from remaining between a power-supplying coil and a power-receiving coil is provided.

The invention claimed is:

1. A wireless power transmission device to wirelessly transmit power to a vehicle, the wireless power transmission device comprising:
a power-supplying coil installed in a slanted state or perpendicularly to a horizontal plane inside a groove formed in a road surface where the vehicle travels and configured to form an electromagnetic coupling circuit along with a power-receiving coil provided in the vehicle.

2. The wireless power transmission device according to claim 1, wherein the power-supplying coil is provided in a plate-like container having at least one surface on which a fluororesin coating film is formed.

3. The wireless power transmission device according to claim 1, wherein the power-supplying coil is provided in a plate-like container having at least one surface on which a large number of micro projections are formed.

4. The wireless power transmission device according to claim 1, wherein the power-supplying coil is provided in a plate-like container having at least one surface on which a large number of grooves extending in a slanted direction are formed.

5. The wireless power transmission device according to claim 1, wherein the power-supplying coil is installed in a state in which at least an upper end portion projects from an installation surface, in a place into which entry of the vehicle is inhibited by a vehicle stopper.

6. The wireless power transmission device according to claim 1, the power-supplying coil is installed at a stopping position at which the vehicle should stop, in a state in which the entire power-supplying coil is embedded below an installation surface.

7. A vehicle configured to receive power wirelessly transmitted from the outside, the vehicle comprising:
a power-receiving coil configured to face the power-supplying coil provided in the wireless power transmission device according to claim 1 and form the electromagnetic coupling circuit along with the power-supplying coil.

8. A vehicle configured to receive power wirelessly transmitted from the outside, the vehicle comprising:
a power-receiving coil provided in a bottom of the vehicle and configured to form the electromagnetic coupling circuit along with the power-supplying coil provided in the wireless power transmission device according to claim 1.

9. A vehicle configured to receive power wirelessly transmitted from the outside, the vehicle comprising:
a power-receiving coil configured to face the power-supplying coil provided in the wireless power transmission device according to claim 5 and form the electromagnetic coupling circuit along with the power-supplying coil.

10. A vehicle configured to receive power wirelessly transmitted from the outside, the vehicle comprising:
a power-receiving coil configured to face the power-supplying coil provided in the wireless power transmission device according to claim 6 and form the electromagnetic coupling circuit along with the power-supplying coil.

11. A vehicle configured to receive power wirelessly transmitted from the outside, the vehicle comprising:
a power-receiving coil provided in a bottom of the vehicle and configured to form the electromagnetic coupling circuit along with the power-supplying coil provided in the wireless power transmission device according to claim 5.

12. A vehicle configured to receive power wirelessly transmitted from the outside, the vehicle comprising:
a power-receiving coil provided in a bottom of the vehicle and configured to form the electromagnetic coupling circuit along with the power-supplying coil provided in the wireless power transmission device according to claim 6.

13. The wireless power transmission device according to claim 1, wherein the groove has an opening.

* * * * *